(12) United States Patent
Sevelsted

(10) Patent No.: US 6,484,840 B1
(45) Date of Patent: Nov. 26, 2002

(54) HYDRAULIC STEERING ARRANGEMENT

(75) Inventor: Nils E. Sevelsted, Nordborg (DK)

(73) Assignee: Sauer-Danfoss Holding A/S, Nordborg (DK)

( * ) Notice: Subject to any disclaimer, the term of this patent is extended or adjusted under 35 U.S.C. 154(b) by 0 days.

(21) Appl. No.: 09/650,392

(22) Filed: Aug. 29, 2000

(30) Foreign Application Priority Data

Sep. 21, 1999 (DE) .......................................... 199 45 122

(51) Int. Cl.[7] .................................................. B62D 5/06
(52) U.S. Cl. ........................... 180/403; 137/567; 60/384
(58) Field of Search ............................ 180/403; 60/384, 60/403, 386; 137/567

(56) References Cited

U.S. PATENT DOCUMENTS

| 4,336,687 | A | * | 6/1982 | Morgan | 60/384 |
| 5,020,618 | A | * | 6/1991 | Nagao | 180/403 |
| 5,136,844 | A | * | 8/1992 | Stephenson et al. | 180/441 |
| 5,244,052 | A | * | 9/1993 | Yamaguchi | 180/414 |
| 5,806,561 | A | * | 9/1998 | Pedersen et al. | 137/567 |
| 5,960,694 | A | * | 10/1999 | Thomas et al. | 180/412 |
| 6,016,656 | A | * | 1/2000 | Sorensen | 60/384 |

FOREIGN PATENT DOCUMENTS

WO 97/30881 * 8/1997

* cited by examiner

Primary Examiner—Daniel G. DePumpo
(74) Attorney, Agent, or Firm—Lee, Mann, Smith, McWilliams, Sweeney & Ohlson

(57) ABSTRACT

A hydraulic steering arrangement with a directional valve and a metering pump unit having two hydraulically parallel connected and mechanically parallel operable metering pumps, each having a toothed ring with inner toothing and a gear wheel with outer toothing being able to perform rotary and orbiting movements in the toothed ring. It is desired to extend the life of the metering pumps. For this purpose, a through-going driving part is provided for both gear wheels.

8 Claims, 2 Drawing Sheets

HYDRAULIC STEERING ARRANGEMENT

Figure 1:
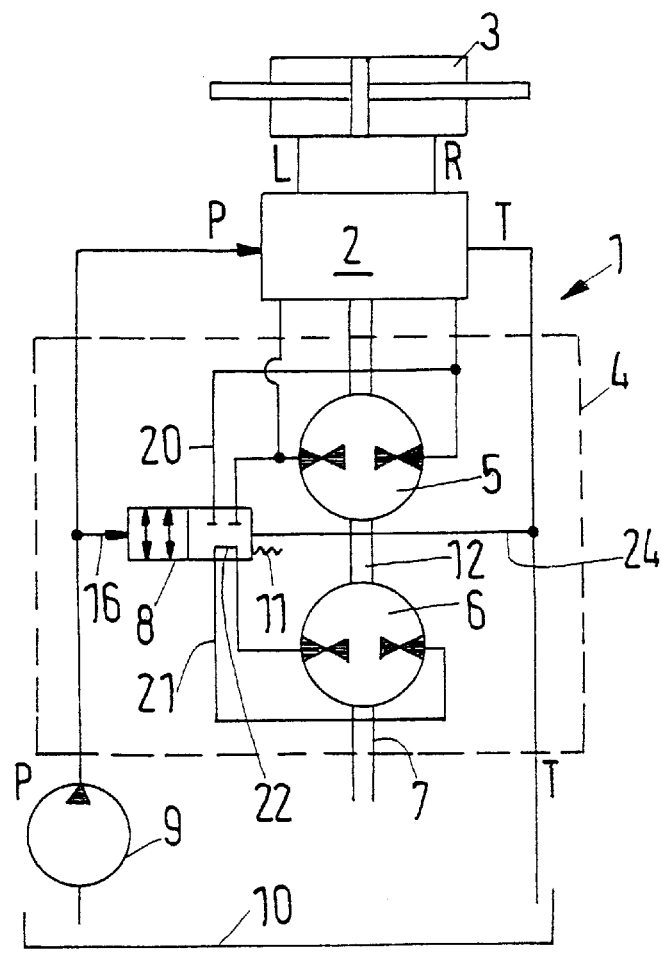

The invention concerns a hydraulic steering arrangement with a directional valve and a metering pump unit having two hydraulically parallel connected and mechanically parallel operable metering pumps, each having a toothed ring with inner toothing and a gear wheel with outer toothing being able to perform rotary and orbiting movements in said toothed ring.

A hydraulic steering arrangement of this kind is for example known from DE 195 11 501 A1 or DE 196 07 0674 A1.

Such steering arrangements are particularly applied in connection with the steering of vehicles. In this connection, the metering pump unit is connected with a steering motor via a directional valve. The directional valve is connected with a steering handwheel or a similar device. When the steering handwheel is turned, the directional valve is displaced in the desired direction. The metering pump unit supplies hydraulic fluid until the steering motor has reached the desired position. In this state the directional valve is displaced again, so that no further supply of hydraulic fluid takes place.

During normal, that is, undisturbed, operation, both metering pumps are active. Accordingly, they can supply a relatively large volume of hydraulic fluid, which enables a quick reaction of the steering motor to movements of the steering handwheel.

When the pressure on the pump connection, which usually provides the pressurised hydraulic fluid, should for some reason decrease or break down, for example because the responsible supply pump is defective or its drive has failed, the metering pumps can also be used as auxiliary pumps in a so-called "emergency operation". In this case, the metering pumps are thus used to pressurise the hydraulic fluid. The required energy for this purpose must be provided via the steering handwheel, that is, usually by means of human muscle power.

In order to facilitate the work for the operator in this connection, the above patent documents disclose the use of only one of the two metering pumps for the fluid transport, disconnecting or short-circuiting the other pump. The operator then only has to operate one metering pump. For the same deflection of the steering motor, he has to turn the steering handwheel a longer distance. The amount of power required, however, is smaller.

In the known case, one of the two metering pumps is driven via a cardan shaft, which is in rotary connection with the gear wheel via a spline connection. Normally, this cardan shaft is required, as the metering pump is arranged eccentrically to other parts of the steering arrangement, which can also rotate. The tapered structure or the inner toothing of the gear wheel also serves the adoption of an additional shaft, by means of which a torque from the gear wheel of the first metering pump is transferred to the gear wheel of the second metering pump. Also this second gear wheel has a corresponding tapered structure on its inside.

It has now been observed that metering pumps of this kind do not always have as long a life as desired.

Accordingly, the task of the invention is to prolong the life of the metering pumps.

In a steering device as mentioned in the introduction, this task is solved in that a through-going driving part for both gear wheels is provided.

Accordingly, the gear wheels of both metering pumps are always driven by the same driving part. Therefore, their movements are to a high degree synchronised. This is a clear improvement in relation to the known cases. Here, the at least double tapered meshing between the first and the second gear wheel always made a small tolerance unavoidable. In unfavourable cases, this tolerance could cause commutation displacements to occur, which again would lead to pressure peaks. The pressure peaks again mean a risk to the gear sets, and in particular for the gear set which is driven by the second shaft, which is normally also made as a cardan shaft. When, however, only one single driving part is used, common for both gear wheels, these problems do not occur. It is substantially easier to keep the commutation in accordance, so that pressure peaks can be avoided or at least substantially reduced.

Preferably, the engagement ratios between the driving part and the gear wheel of each metering pump are equal. In a relatively simple embodiment, this can be realised in that the engagement geometry of both gear wheels is kept the same. Thus, the driving part is provided with uniform engagement geometry over its whole axial length. Also the two gear wheels have an identical engagement geometry. Thus, additionally to the use of a common driving part, the same engagement geometry or the same engagement behaviour, respectively, ensures that both gear wheels are driven in practically identical ways.

Preferably, the driving part is made of part of the directional valve. In this case, a tolerance will not occur in a possible connection between the driving part and the corresponding part of the directional valve. On the contrary, the directional valve continues into the metering pump with the driving part.

Preferably, the directional valve has an inner rotary slide and an outer rotary slide, which are rotatable in relation to each other, the outer rotary slide extending eccentrically through the gear wheels of the metering pump, and the gear wheels being in torque-transmitting connection with the outer rotary slide. At the same time, the gear wheels rotate and orbit in the corresponding toothed rings. Thus, with their centre they describe a rotation around a rotation axis of the rotary slides. It can now be ensured that between the outer rotary slide and the gear wheels a connection exists, which transmits the rotary torque, not, however, the orbiting movement, to the rotary slide. In this case, the rotary slide can be arranged concentrically around the toothed ring of the metering pump.

Preferably, each gear wheel has an inner toothing, which engages with an outer toothing of the outer rotary slide, the engagement being limited to a circumferential area, which travels in the circumferential direction when the gear wheels are orbiting. With this relatively simple measure, the movement transmission from the gear wheel to the rotary slide can be limited to a pure rotary movement. The movement is transmitted via the engagement between the inner toothing and the other toothing. The orbiting movement of the gear wheel is permitted, as the rotary slide always only engages with the gear wheel on part of its circumference. The remaining part is free and can thus be used for the orbiting movement.

Preferably, the outer rotary slide has a reduced diameter on the section arranged close to the gear wheels. Thus, the outer dimensions of the steering arrangement can be kept exactly as small as in the known cases mentioned in the introduction. In fact, the same housing can also be used. Merely the metering pump section has to be changed a little.

Preferably, the inner rotary slide bears axially with one end on a wall of the outer rotary slide projecting radially inwards. Thus, the inner rotary slide is fixed in the outer rotary slide, so that the overlapping of the control openings and recesses can be maintained over a longer period with an extremely high accuracy.

It is also advantageous when the driving part passes through one of the gear wheels in its full length and projects at least halfway into the other gear wheel. Thus, it is obtained that the gear wheels do not tilt in relation to the rotary slide, that is, do not incline out of their rotation level. Also this measure serves the purpose of keeping the wear at a low level.

In the following the invention is described in detail on the basis of a preferred embodiment in connection with the drawings, showing:

FIG. 1 a schematic block circuitry of a steering arrangement

Figure 2:
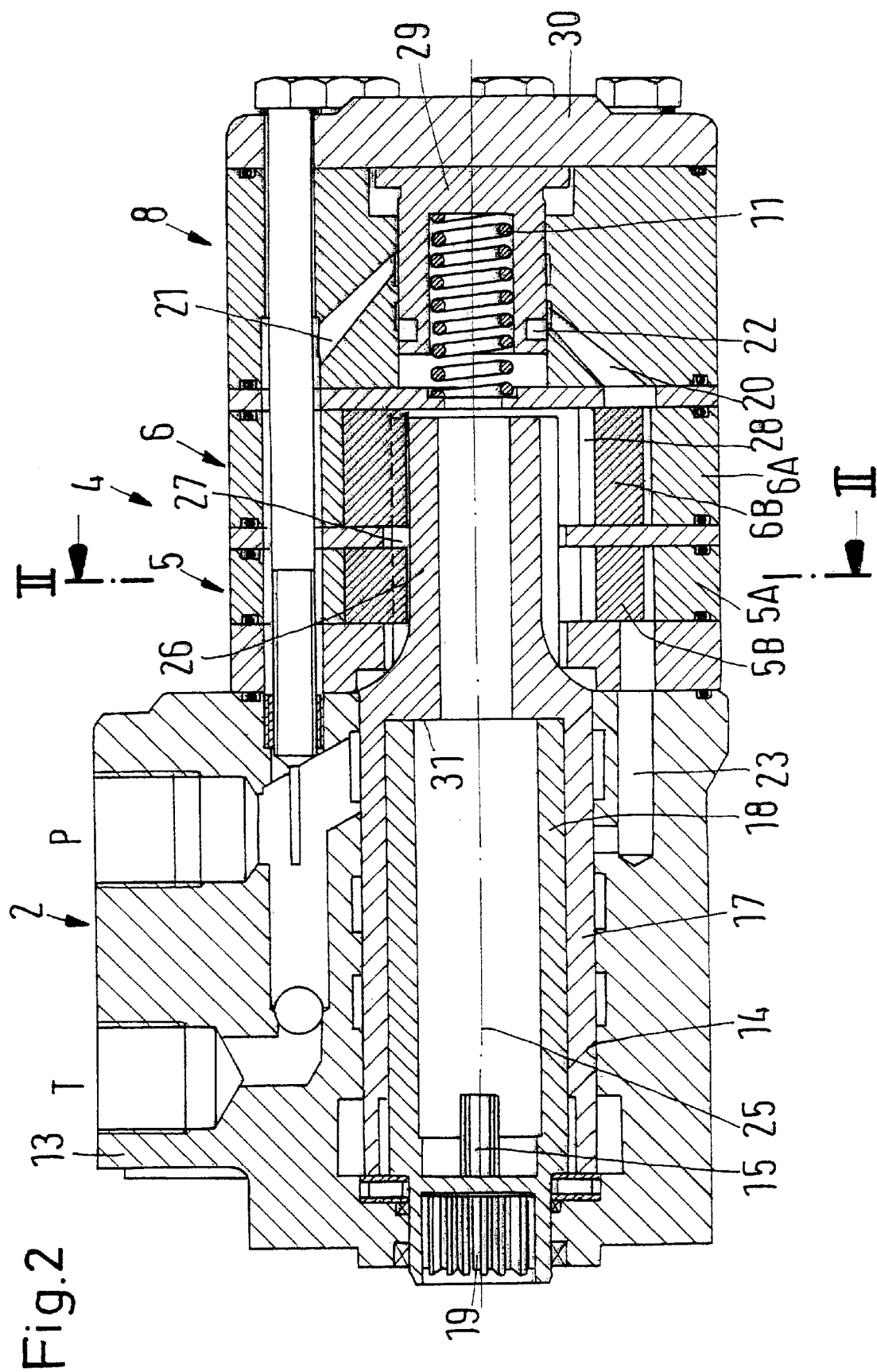

FIG. 2 a schematic longitudinal section through a steering arrangement

Figure 3:
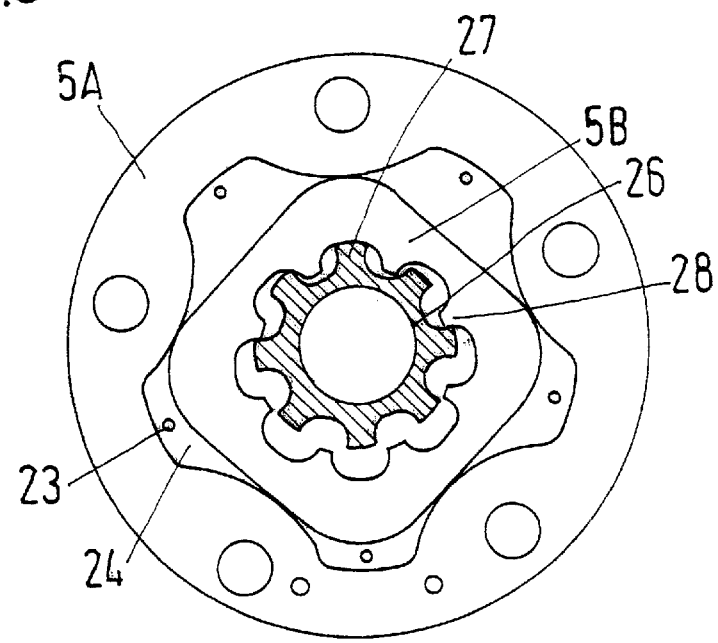

FIG. 3 a section II—II according to FIG. 2

A hydraulic steering arrangement 1, shown schematically in FIG. 1, has a directional valve 2, which is connected with two working connections L, R, which are connectable with a steering motor 3. Further, a pump or pressure connection P and a tank connection T are provided.

The other side of the directional valve 2 is connected with a metering pump unit 4, which has a first metering pump 5 and a second metering pump 6, which are connected hydraulically in parallel. A shaft 7 serves the connection of the metering pump unit 4 with a steering handwheel, not shown in detail. Between the two metering pumps 5, 6 a mechanical connection 12 is provided, which ensures that a torque, which is initiated via the shaft 7, does not only act upon the metering pump 6, but also upon the metering pump 5. Already here it is noted that the metering pump 5 has a larger displacement than the metering pump 6.

The term that the first and the second metering pumps 5, 6 are connected hydraulically in parallel means that the inlet connection of the metering pump 5 is, or can be, connected with the corresponding inlet connection of the second metering pump 6, and the outlet connection of the first metering pump 5 is, or can be, connected with the corresponding outlet connection of the second metering pump 6. The metering pump unit 4 namely has an additional shut-off valve 8, which can break this hydraulic connection between the first metering pump 5 and the second metering pump 6. In the position shown in FIG. 1 the connection is broken, and the second metering pump 6 is short-circuited, so that a rotation of the shaft 7 merely enables the first metering pump 5 to transport hydraulic fluid to the directional valve 2. Accordingly, the driving torque required for the shaft 7 only has to be sufficient to drive the metering pump 5 with smaller displacement.

The operation of such a steering arrangement 1 is known per se. A pump 9 transports hydraulic fluid from a tank 10 to the directional valve 2. At the same time the shut-off valve 8 is displaced against the force of a spring 11 to a position, in which the two metering pumps 5, 6 are connected hydraulically in parallel. When the shaft 7 is activated, hydraulic fluid reaches the steering motor 3 via the directional valve 2. In this connection, the amount of hydraulic fluid is determined by the metering pumps 5, 6. They reset the directional valve 2 to its closed position, when the steering motor has moved so as to correspond with a predetermined rotation of the shaft 7.

When now the pump 9 fails, that is, no pressure is available on the pump connection P of the directional valve 2, the shut-off valve 8 shuts off under the influence of the spring 11, that is, it breaks the connection to the two metering pumps 5, 6. Merely the metering pump 5 can still work together with the directional valve 2. When the shaft 7 is turned, the metering pump 5 transports the hydraulic fluid required to operate the steering motor 3.

Normally, other connections and pipes are provided, particularly a load pressure control connection LS, which, however, for reasons of clarity, is not shown here.

FIG. 2 now shows the detailed embodiment as a longitudinal section through a unit, in which the directional valve 2, the metering pump unit 4 and the shut-off valve 8 are flanged together in the axial direction. Here, the sequence of the metering pumps 5, 6 is reversed.

The directional valve 2 has a housing 13, in which a bore 14 is arranged. In the bore 14 is concentrically arranged an outer rotary slide 17 in which again is arranged concentrically an inner rotary slide 18. By means of a spring arrangement 15, the two rotary slides 17, 18 are preloaded in a neutral position.

On the inner rotary slide 18, an engagement profile 19, for example a spline profile, is arranged, which serves the adoption of the shaft 7. When, thus the shaft 7 is turned, the inner slide 18 is also turned.

In a manner not shown in detail, but commonly known, the two rotary slides 17, 18, have grooves and breakthroughs, with which, depending on the rotation direction, a connection between the pump connection P and one of the two working connections L, R, or between the other of the two working connections R, L and the tank connection T, respectively, can be established. These grooves and breakthroughs also serve the release or closing of the corresponding fluid paths to the metering pump unit.

Each of the two metering pumps 5, 6 of the metering pump unit 4 has an internally toothed toothed ring 5A, 6A and an externally toothed gear wheel 5B, 6B. This can be seen, for example, from FIG. 3. In this connection, the toothed ring 5A, 6A has one tooth more than the gear wheel 5B, 6B.

Via corresponding pressure lines 23, pressure pockets 24 are supplied in the correct position with hydraulic fluid under pressure, or hydraulic fluid is drained off from them, so that the gear wheel 5B orbits in the toothed ring 5A and at the same time rotates. To be able to realise the corresponding sealings between the individual pressure pockets 24, the gear wheel 5B actually has an approximately square shape.

The gear wheel 5B is arranged eccentrically to the rotation axis 25 of the two rotary slides 17, 18.

The outer rotary slide 17 has an extension 26, which projects completely through the two metering pumps 5, 6. In relation to the section arranged in the housing 13 of the directional valve 2, the extension 26 has a reduced diameter. At the same time, a wall section forms an axial stop for the inner rotary slide 18. In this connection, the extension 26 penetrates the gear wheel 5B completely and the gear wheel 6B almost completely, at least on a distance, which is larger than half the extension of the gear wheel 6B. On its circumference, the extension 26 has an outer toothing 27, which is constant across the axial length of the extension 26, that is, does not change. This toothing 27 engages with an inner toothing 28 of the gear wheels 5B, 6B. Also the toothing 28 is unchanged across the axial length and is equal for both gear wheels 5B, 6B.

As can be seen from FIG. 3, however, the two toothings 27, 28 do not engage over the whole circumference of the extension 26. On the contrary, the engagement is limited to a circumference section. Over the remaining circumference area, the gear wheel 5B, 6B is free of the extension, the circumference section with the engagement, however, travelling on the circumference of the extension 26 on a rotation of the gear wheel.

With this embodiment it is possible merely to transmit the rotary movement of the gear wheels 5B, 6B to the extension 26 and thus to the outer rotary slide 17. The orbiting share of the movement of the gear wheels 5B, 6B, however, is not transmitted to the extension 26.

Thus, it is ensured that both metering pumps 5, 6 are in exactly the same driving connection with the extension 26 of the outer rotary slide 17. The angle positions of the gear wheels 5B, 6B thus correspond to each other at any time. Deviating commutations can therefore not occur in the two metering pumps 5, 6, and resulting pressure peaks are avoided, which has a very positive effect on the life of the metering pumps 5, 6. Both metering pumps, or rather the two gear sets 5A, 5B and 6A, 6B, respectively, always work synchronously, as they are connected with the same driving unit, namely the outer slide 17.

Otherwise, the embodiment of the steering arrangement shown in FIG. 2 corresponds to the one known from DE 196 07 064 A1, to which is referred for a detailed description of the shut-off valve 8. The shut-off valve 8 has a slide 29, which is pressed against a cover plate 30 by the force of the spring 11. In a manner not shown in detail, the side of the slide 29 turning away from the spring 11 can be pressurised, for example via a control pressure line 16 shown in FIG. 1, so that a connection between two lines 20, 21 is released. Many of the grooves in the slide 29 required for this are not in the drawing level. In the shown position of the slide 29, however, an annular groove 22 short-circuits the second metering pump 6.

What is claimed is:

1. Hydraulic steering arrangement with a directional valve and metering pump unit having two hydraulically parallel connected and mechanically parallel operable metering pumps, each having a toothed ring with inner toothing and a gear wheel with outer toothing being able to perform rotary and orbiting movements in said toothed ring, and including a single piece through-going driving part which simultaneously drive both gear wheels.

2. Steering arrangement according to claim 1, in which the driving part and the gear wheel of each metering pump have an engagement ratio, the engagement ratio being equal.

3. Steering arrangement according to claim 1, in which the driving part is part of the directional valve.

4. Steering arrangement according to claim 1, in which the directional valve has an inner rotary slide and an outer rotary slide, which are rotatable in relation to each other, the outer rotary slide including an extension comprising the through-going part which extends eccentrically through the gear wheels of the metering pumps, and the gear wheels being in torque-transmitting connection with the outer rotary slide.

5. Steering arrangement according to claim 4, in which each gear wheel has an inner toothing which engages an outer toothing of the outer rotary slide, the engagement being limited to a circumferential area, which, in the orbiting gear wheels, travels in a circumferential direction.

6. Steering arrangement according to claim 4, in which the outer rotary slide has a reduced diameter close to the gear wheels.

7. Steering arrangement according to claim 4, in which the inner rotary slide bears axially with one end on a wall of the outer rotary slide which projects radially inwards.

8. Steering arrangement according to claim 1, in which the driving part passes fully through one of the gear wheels and projects at least halfway into the other gear wheel.

* * * * *